United States Patent [19]

Nelson

[11] Patent Number: 5,275,249
[45] Date of Patent: Jan. 4, 1994

[54] RAISABLE HOOD PLATE MECHANISM

[76] Inventor: Richard L. Nelson, 17242 Riley, Holland, Mich. 49424

[21] Appl. No.: 799,384

[22] Filed: Nov. 27, 1991

[51] Int. Cl.$^5$ .................................. B62D 25/10
[52] U.S. Cl. ........................ 180/69.2; 180/68.1; 180/69.21; 180/69.24; 296/180.3
[58] Field of Search ............ 180/68.1, 69.2, 69.21, 180/69.24, 69.25; 296/91, 180.1, 180.2, 180.3; 49/31, 29, 30; 114/364

[56] References Cited

U.S. PATENT DOCUMENTS

| | | | |
|---|---|---|---|
| 1,630,342 | 5/1927 | Huhnholz | 180/68.1 |
| 1,983,723 | 12/1923 | Wilson | 138/54 |
| 1,984,077 | 12/1934 | Morrison | 180/69.24 |
| 2,823,072 | 2/1958 | Podolan | 296/91 |
| 2,930,650 | 3/1960 | Vosen | 296/91 |
| 3,574,392 | 4/1971 | Hirano | 296/91 |
| 3,688,856 | 9/1972 | Boehm et al. | 180/5 |
| 3,961,605 | 6/1976 | Kaltner | 123/41.05 |
| 4,040,656 | 8/1977 | Clenet | 296/91 |
| 4,153,291 | 5/1979 | Conti et al. | 180/69.2 |
| 4,590,890 | 5/1986 | Tamba et al. | 123/41.7 |
| 4,606,422 | 8/1986 | Jewett | 180/68 |
| 4,658,925 | 4/1987 | Hirosawa et al. | 180/68 |
| 4,850,444 | 7/1989 | Bojanowski et al. | 180/68 |
| 4,996,442 | 2/1991 | Wayne | 307/10.1 |

FOREIGN PATENT DOCUMENTS

| | | | |
|---|---|---|---|
| 2925035 | 1/1981 | Fed. Rep. of Germany | 49/30 |
| 2629765 | 10/1989 | France | 180/68.1 |
| 440954 | 1/1936 | United Kingdom | 296/91 |

Primary Examiner—Eric D. Culbreth
Attorney, Agent, or Firm—Kinney & Lange

[57] ABSTRACT

A raisable hood plate mechanism for a vehicle hood comprises a pair of large plates laterally spaced in separate centered openings on opposite sides of the hood. The plates are pivotable along front edges and raisable at rear edges to provide rear-facing engine compartment ventilation, as well as glare deflection from the operator's eyes and bug and stone deflection from the windshield. The plate can be opened manually or by mechanical, fluid or electrical remote actuation mechanisms. An automatic closer can be employed. The plate can be light transmissive and solar collectors can be used with the plate.

22 Claims, 6 Drawing Sheets

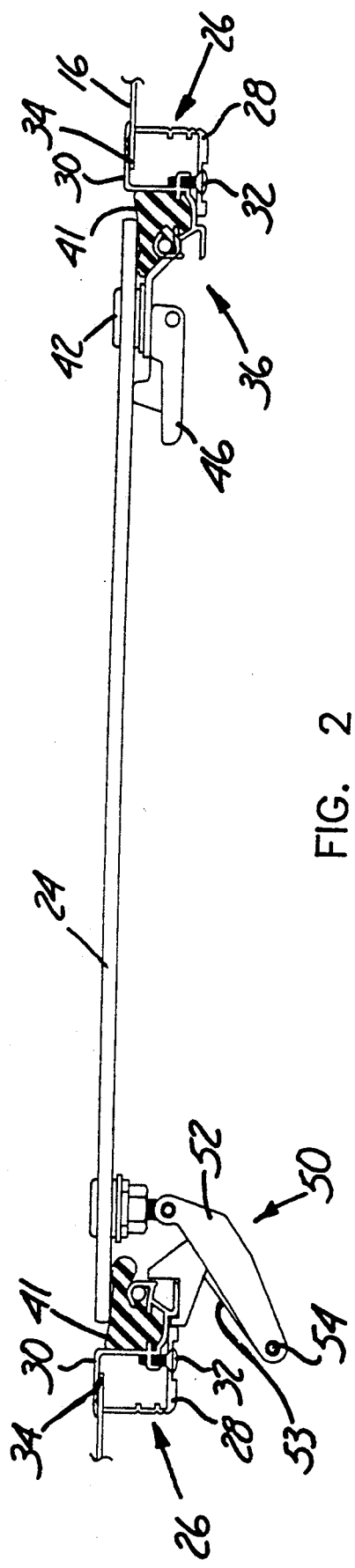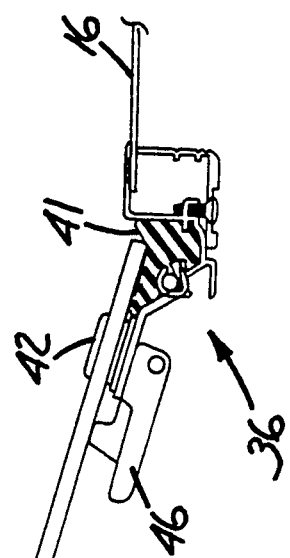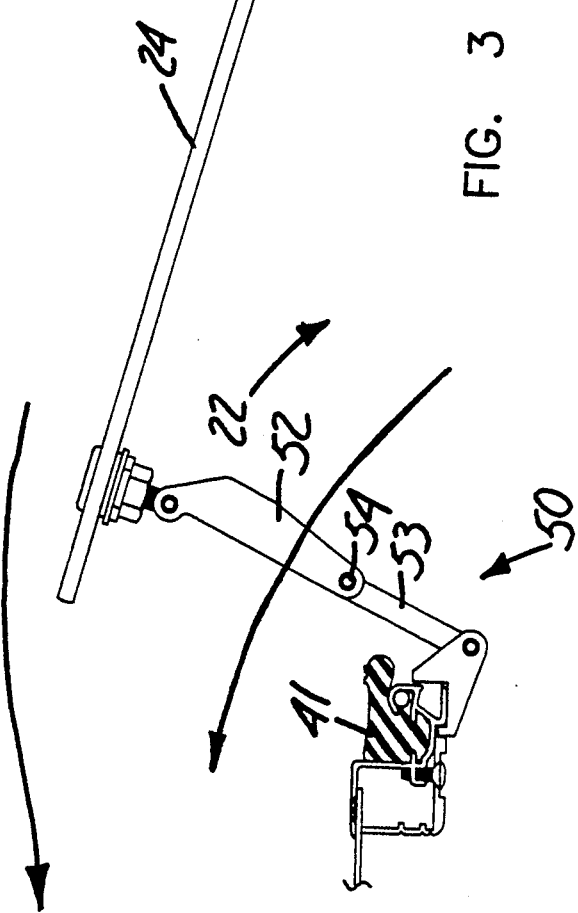

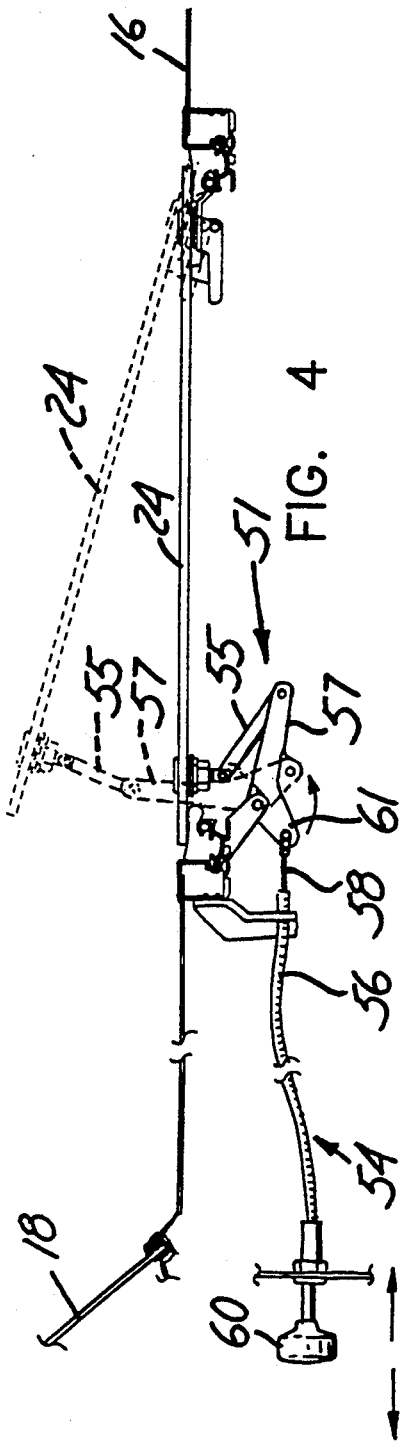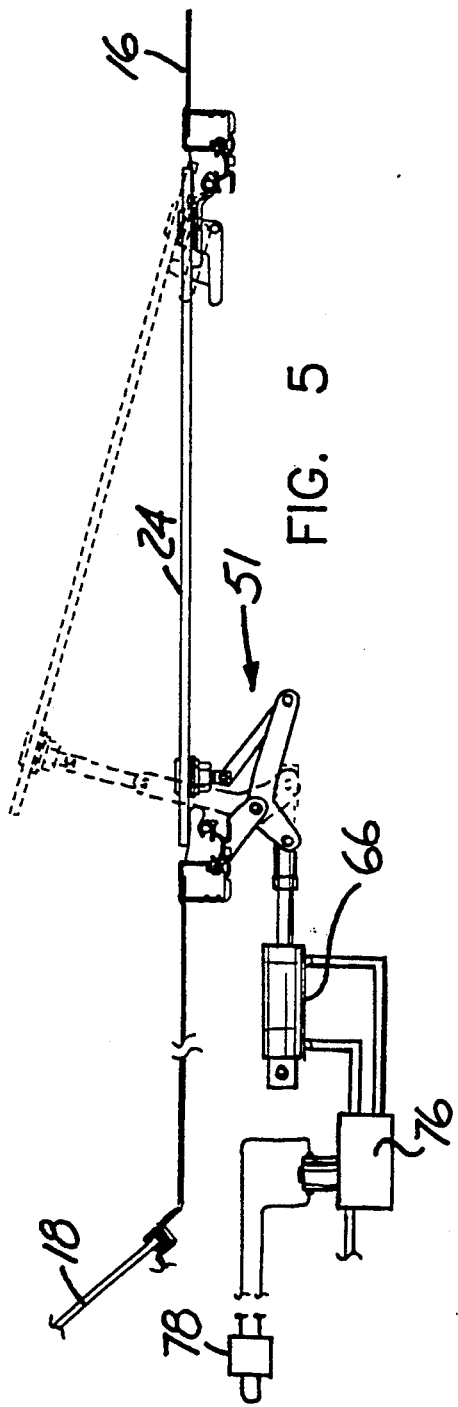

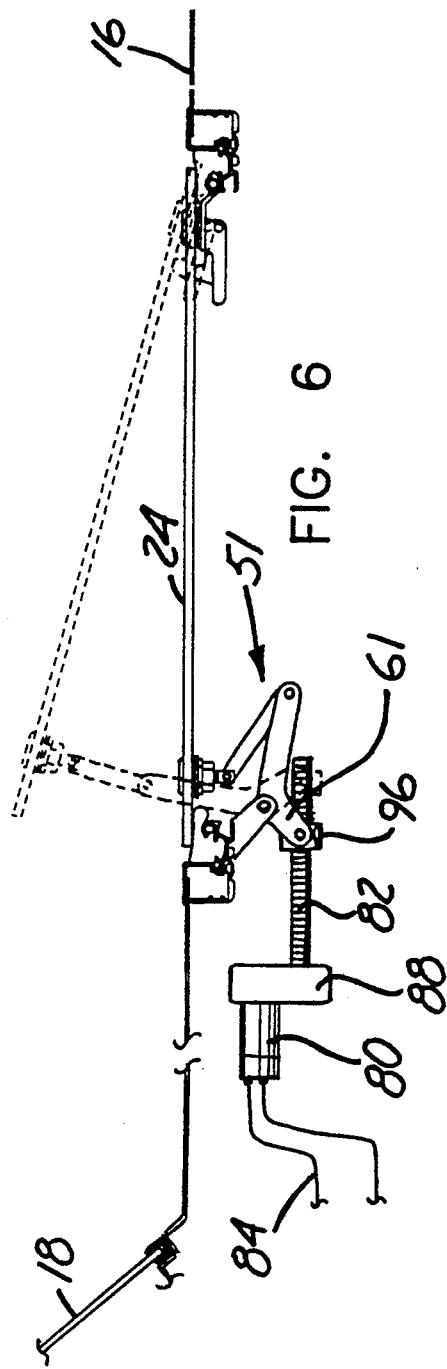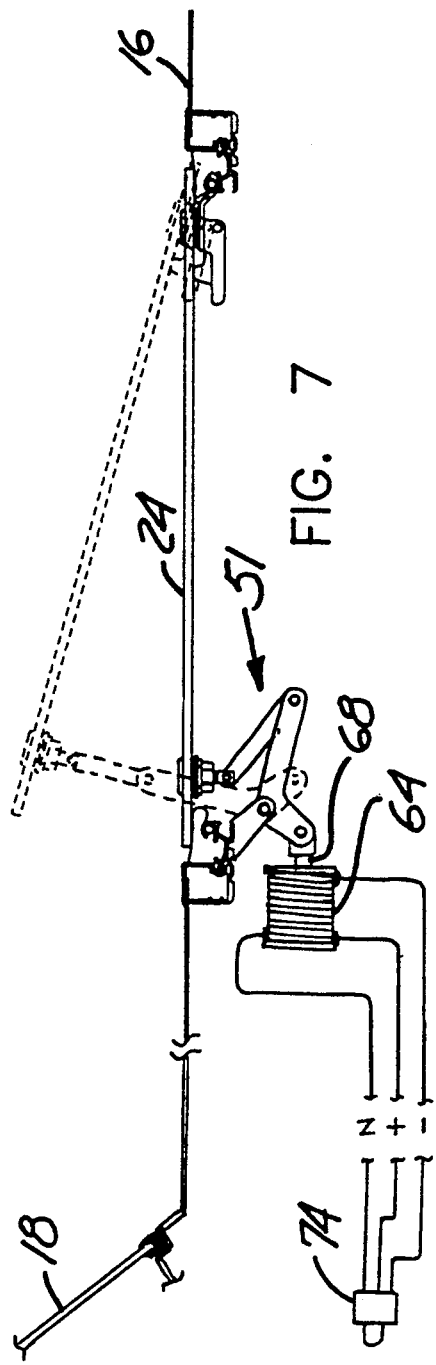

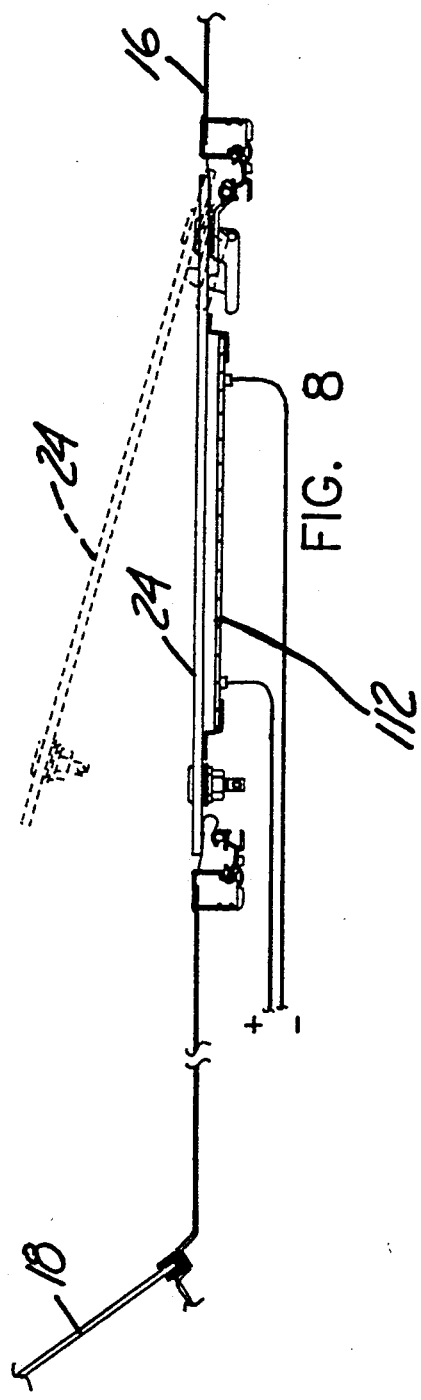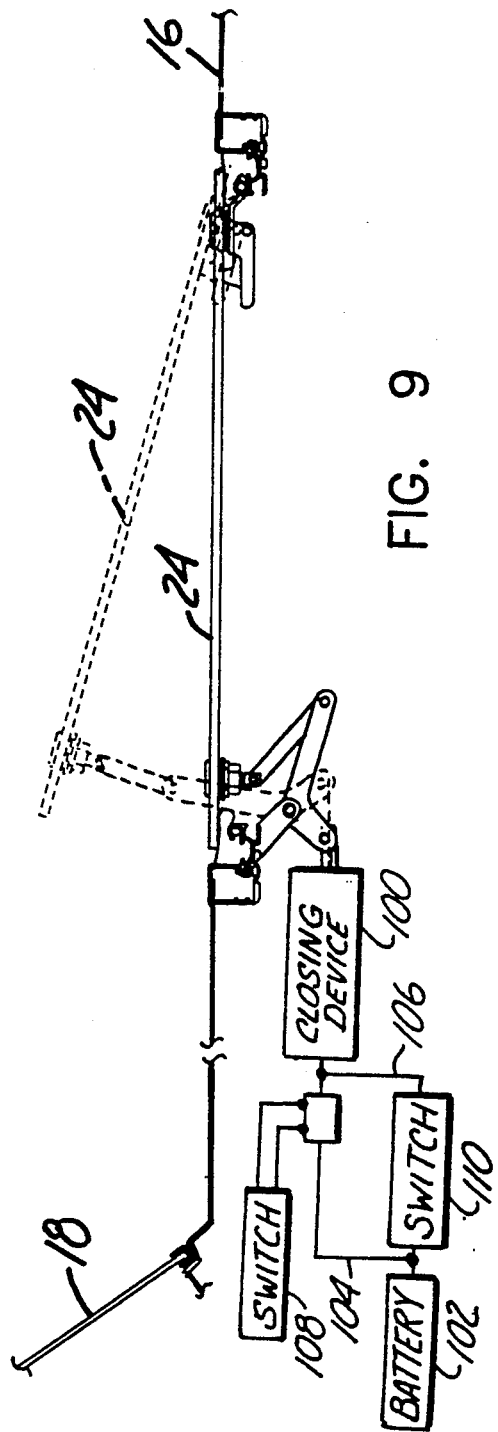

RAISABLE HOOD PLATE MECHANISM

BACKGROUND OF THE INVENTION

This invention relates to a raisable hood plate that is mounted in the engine compartment hood of a vehicle so as to provide selective ventilation for the engine compartment and a glare and particle deflector for the windshield, as well as providing light transmission into the engine compartment.

In a vehicle such as a front engine automobile or truck, the engine compartment is positioned in front of the windshield and is accessed by raising and lowering a hood. When the hood is closed and the engine is operating, the enclosed engine compartment tends to trap engine heat in the engine compartment.

At the same time, the upper surface of the hood typically is a generally flat, shiny, horizontal surface leading to the windshield. This surface can reflect sunlight into the eyes of the vehicle operator through the windshield and does nothing to deflect bugs or stones that are entrained in the air passing over the hood and the windshield. The vehicle hood also prevents penetration of solar radiation into the engine compartment as well as preventing viewing of the components of the engine without raising the hood.

A number of devices have been developed to provide ventilation of an engine compartment. These include open ports in the top or side of the hood, louvered hood vents and the like. In another device, the cowl of a windshield wiper assembly is openable selectively in order to vent the engine compartment at the base of the windshield.

In addition to hood vents, many vehicles include hood scoops, which are forward facing scoops that pull air into an engine compartment.

One object of the present invention is to provide a raisable hood plate mechanism that provides for selective ventilation of an engine compartment by means of a raisable plate that creates a rear facing vent for withdrawing heated air from the engine compartment.

Another object of the present invention is to provide a raisable hood plate that deflects glare, bugs, and stones away from the windshield of a vehicle.

Still another object of the present invention is to provide a raisable hood plate that transmits light or solar radiation into the interior of the engine compartment for viewing or for use as a passive or electrical solar collector.

SUMMARY OF THE INVENTION

In accordance with the present invention, a raisable hood plate mechanism comprises one or more plates that are mounted in openings in a vehicle hood. Each plate is hinged along a front edge and is raisable along a rear edge from a lowered position, wherein the plate lies in the plane of the hood and seals the hood, to a raised position, wherein the plate creates a glare and particle deflector as well as a rear facing opening at the rear edge of the plate that serves to ventilate the engine compartment. Desirably, there are separate large plates, centrally mounted in separate hood openings on each lateral side of the upper surface of the hood, with each plate being raisable either manually or from the interior of the vehicle by a mechanical cable, a fluid drive, or an electrical drive system. The plates are desirably formed of a light transmitting material such as a smoked or mirrored glass. A passive or electrical solar energy collector can be provided under the plate for heating the engine compartment on cold days or for charging the battery. The apparatus can include an automatic closing device that closes the plate and locks it closed whenever the engine is stopped or turned off for a period of time.

These and other features of the present invention are shown and described in detail below in connection with a description of the preferred embodiment of the present invention.

BRIEF DESCRIPTION OF THE DRAWINGS

FIG. 2 is a sectional view taken along the lines 2-2 of FIG. 1.

FIG. 3 is a sectional view of the open vent taken along the lines 3—3 of FIG. 1.

FIG. 4 is a schematic view showing a cable mechanism for raising and lowering the hood plate from the interior of the vehicle.

FIG. 5 is a schematic view showing a hood plate system opened and closed by a pneumatic or hydraulic drive mechanism.

FIG. 6 is a schematic view showing a raisable hood plate system operated by an electrical or fluid drive motor for raising and lowering the hood plate gradually.

FIG. 7 is a schematic view showing a hood plate system that is open and closed by an electrical solenoid.

FIG. 8 is a schematic view showing the incorporation of solar energy cells under the light transmitting plate of the present invention.

FIG. 9 discloses a schematic view of an automatic hood plate closing mechanism wherein the hood plate closes automatically when the temperature in the engine compartment drops to a predetermined level or other condition indicates that the plate should be closed.

DETAILED DESCRIPTION OF THE PREFERRED EMBODIMENT

Figure 1:
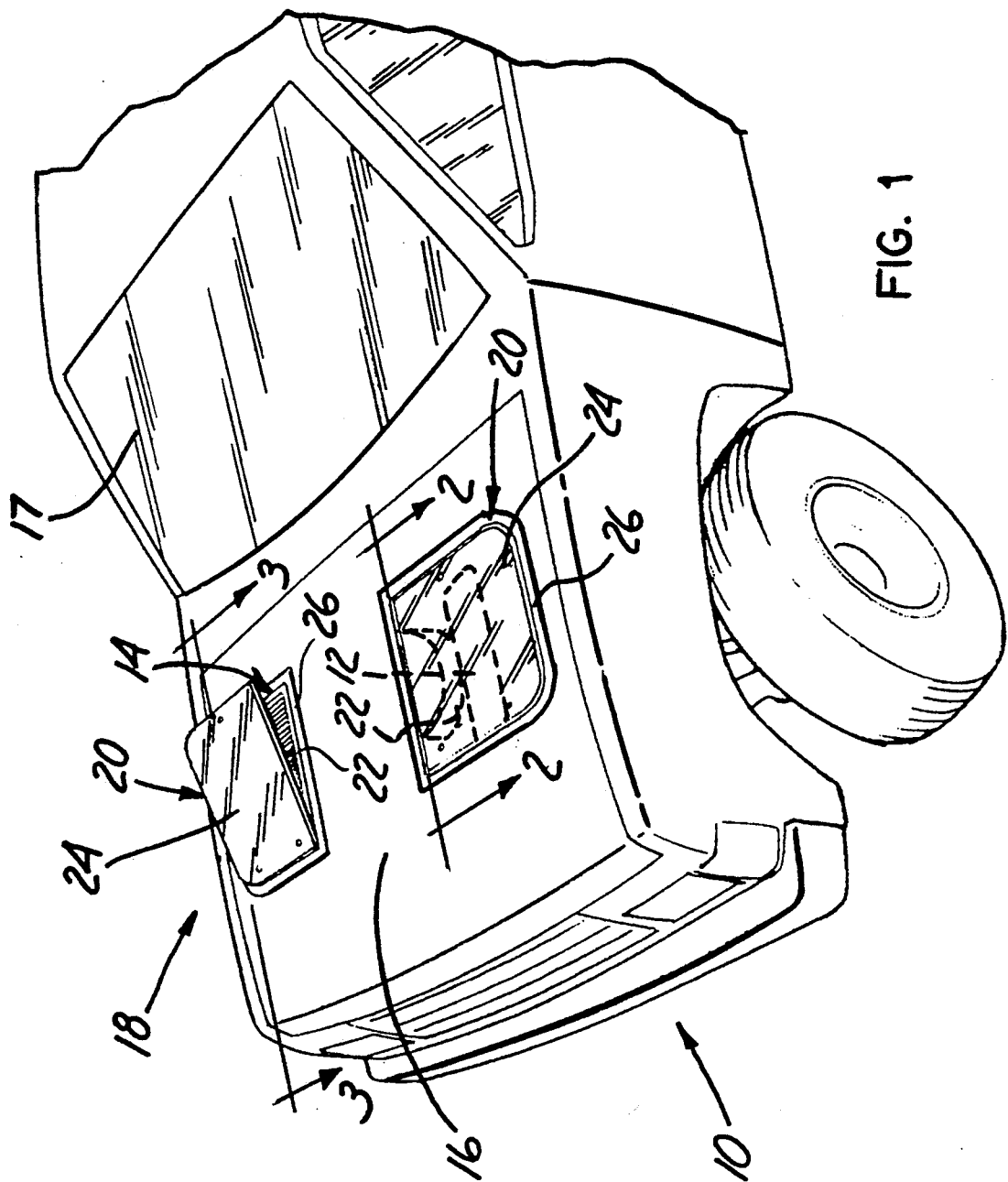
FIG. 1 is a partial perspective view showing the present invention mounted in an automobile hood.

Referring to the drawings, for exemplary purposes the present invention will be described in connection with a conventional automobile 10 which has a front-mounted engine 12 in an engine compartment 14 enclosed by a hood 16, which is positioned in front of the driver's windshield 17. The installation of the present invention in the hood of an automobile is shown for illustrative purposes, but the present invention could be employed in any other type of vehicle, such as a truck, wherein similar construction is employed.

As shown in FIG. 1, a raisable hood plate system 18 is mounted in the hood of the automobile. Raisable hood plate 18 comprises a pair of separate hood plate mechanisms 20, each mounted in a separate opening 22 spaced laterally apart on opposite sides of the hood vent. The hood openings desirably are placed in a generally centered position on the hood surface, being positioned forwardly of the rear edge of the hood and inwardly of the sides of the hood and rearwardly from the curved front nose of the hood. In such a position, the hood is typically generally horizontal and flat, and a generally flat portion of the hood is desired for the preferred practice of the present invention.

Functionally, the number and placement of the hood plates can vary. The hood plates of the present invention are selected because of a desirable appearance as well as accomplishing the functional purposes of the present invention. Two plates are employed in the present invention, and these plates are mirror images of each other or could be the same. For convenience, a single plate will be described in detail.

Raisable hood plate mechanism 20 comprises a flat plate 24 preferably formed of a light transmissive material, such as a glass or plastic resin. Desirably, the plate may be formed of a smoked glass, and this may even have a mirrored surface for deflecting light rays and improving aesthetic appearance.

As shown in FIG. 2, plate 24 fits in a frame 26 that surrounds the plate. Frame 26 has a lower member 28 and an upper member 30 which are screwed together by screws 32 on opposite sides of the peripheral edge 34 of an opening 22 in the hood. Desirably, the hood opening is generally rectangular, with at least a generally transverse leading edge facing the forward direction of the vehicle.

Figure 10:
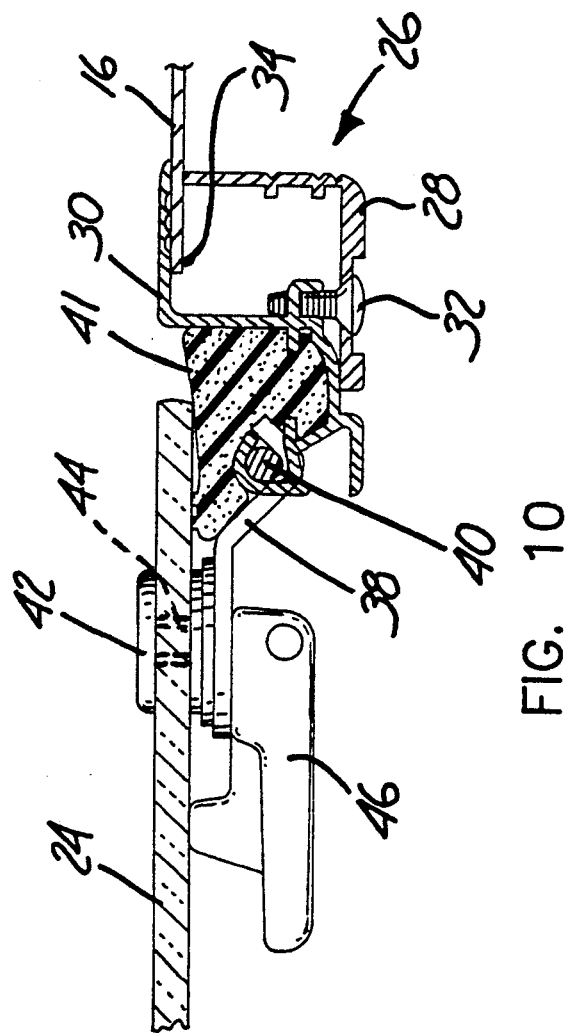
FIG. 10 is a sectional view of the hood plate hinge mechanism of the present invention.

Glass plate 24 is attached to frame 26 at a forward edge by means of a pair of hinges 36. As shown in detail in FIG. 10, the hinges may be curved metal plates 38 that fit over stationary pins 40 in the frame and permit the plate to be rotated about pins 40. The plates 38 may be fastened to the surface of the glass by a clamp 42 that is mounted in an opening 44 of glass plate 24. The clamp has a pivotable latch 46 for releasing plate 38 from pin 40 for removal of the entire plate from the opening. The hinge mechanism is conventional and is not a part of the present invention. Other hinge mechanisms also could be employed. The desirable feature of the hinge mechanism is that the glass plate 24 can be sealed tightly in the frame so that water does not leak around the edges of the plate when it is locked in a closed position. A seal 41 surrounds the edge of the frame where the plate is received in a closed position.

At the rear edge of the plate (in the direction of forward car movement), the plate is connected to the frame by means of an openable latch mechanism 50. Latch mechanism 50 also can be conventional and may have a closed position as shown in FIG. 2 and an open position as shown in FIG. 3, with the latch comprising a pair of pivotable links 52 and 53, pivotally connected at their ends to the frame and the plate and having a pivotal interconnection pin 55 connecting the arms. Desirably, the latch can be locked in a closed position and will hold the plate in a raised position when the latch is open.

With the latch of FIGS. 2 and 3, the plate is opened manually by raising the hood, setting the latch in its open or closed position and then closing the hood.

While the hood plate mechanism of the present invention can be a unit that is specially designed and constructed for a particular vehicle, it is possible to use a conventional vehicle sunroof for the hood plate mechanism. A conventional two-piece sunroof assembly is especially suitable for the manually openable hood plate mechanism shown herein.

A number of other ways that the plate can be opened and closed are disclosed in FIGS. 4-7. In FIG. 4, the plate is opened and closed from the interior of the vehicle by a manual push-pull cable 54 comprising a helical outer casing 56 and an inner cable 58 slidably contained in the casing and being actuatable by a knob 60 on an end position inside the vehicle. The inner cable engages an arm 61 on the latch mechanism 51 to open the latch by pivoting links 55 and 57 to the open position shown in phantom.

The same function can be achieved by means of an electrical solenoid 64, as shown in FIG. 7, or by a two-directional fluid drive cylinder 66, as shown in FIG. 5. In FIG. 7, the solenoid 64 has a retractable output shaft 68 connected to the raisable latch or linkage mechanism 51 (which can be the same as used with other plate raising mechanisms), with the solenoid being operated by a battery (the car battery, not shown) and actuated by a switch 74 positioned inside the vehicle.

Similarly, in FIG. 5, the same function can be achieved by the two-directional pneumatic or hydraulic drive cylinder 66, which is provided with fluid by means of a pump 76 or the like and actuated by a switch 78.

In FIG. 6, the drive mechanism is not simply a push-pull drive mechanism that has basically an open and a closed position but provides for a gradual opening and closing of the plate by means of an electrical or pneumatic drive motor 80 that has a rotatable output shaft 82. The drive motor (which would be pneumatic or electric and not both) is shown schematically as having electrical interconnections 84.

In either case, the motor drives the threaded output shaft 82 through a reduction gear 88. A nut 96 on the outer end of arm 61 is threaded to shaft 82, such that as shaft 82 rotates, the shaft causes axial movement of nut 96 along the shaft. This causes the latch to raise and lower the plate.

Other types of latch mechanisms can be employed. The illustrations and descriptions herein are intended to represent exemplary latches.

FIG. 9 discloses in schematic form another feature of the present invention, wherein the plate is automatically closed after a predetermined period of time if the vehicle is turned off. Plate 24 is closed by means of a closing device 100. This could be any of the electrical devices discussed above. A fluid driven analog also could be used as a substitute.

Closing device 100 is operated by a battery 102 by means of one of two parallel circuits 104 and 106. Circuit 104 contains a manual actuated switch 108 that is actuated from the vehicle at the election of the vehicle operator. If the vehicle is turned off and stopped, an automatic switch 110 can override switch 108 to automatically actuate the plate closing mechanism 100 and close the plate under desired circumstances. Preferably, switch 110 is a thermostatic switch that automatically closes the plate whenever the temperature in the engine compartment (or the temperature of any operating fluids) drops to a predetermined level. Switch 110 also could be or could include a timer switch connected into the ignition circuitry of the vehicle so as to cause the plate to close after the vehicle engine has been turned off for a predetermined period of time. In either case, the switch would be effective in closing the plate a short time after a vehicle is stopped and turned off. This is a particularly desirable feature when a person turns off and leaves the vehicle with the hood plates in an open position. The hood plates will automatically close shortly thereafter in order to prevent water from coming under the hood and to prevent vandals from tampering with the apparatus or reaching through the hood plates.

One of the advantages provided by the present invention is that the hood plate provides a means for ventilating the engine compartment when the engine is hot. The hood plate creates a rear facing vent. Hot air from the engine compartment tends to rise and would ordinarily be trapped by the enclosed engine hood. With the rear facing vent of the present invention, the hot air can escape from the engine compartment when the vehicle is stationary, and the hot air will actually be drawn from the engine compartment by the venturi effect of air flowing over the trailing edge of the raised plate when the vehicle is moving in a forward direction. Raising the hood plate therefore augments engine cooling significantly.

As shown in FIG. 3, the raisable hood plate also provides other advantages. The hot air from the engine compartment is directed rearwardly toward the windshield. In cold weather, this could have an increased effect in defrosting a windshield. Also, during times of day when hood glare from the hood is a problem, raising the hood plate causes the deflected rays to be diverted in a direction away from the windshield of the car, thus relieving glare stress on the operator.

The raisable hood plate also provides an inclined ramp or plate in front of the windshield. This causes air passing over the hood to be deflected upwardly away from the surface of the windshield. Thus, bugs and stones that are entrained in air directed toward the windshield are deflected away from the windshield by the raised hood plate.

While the present invention contemplates that one or more centered plates of somewhat different sizes and shapes could be employed, it is desired two relatively large hood plates be employed and that each be positioned in its own opening in the hood, with one of the plates being in front of the driver's side of the vehicle. A pair of plates spaced as shown in FIG. 1 on opposite lateral sides of the car is particularly desirable. Desirably, the hood plates cover an area of about ten percent (10%) to about thirty percent (30%) of the area of the generally flat, horizontal surface of a hood where they are mounted. The area of the plates should be large enough to provide adequate glare and bug deflection capabilities in addition to hood ventilation. Plates substantially larger than thirty percent (30%) of the surface area of the hood can cause a reduction in the strength of the hood structure. By using two separate plates, spaced apart by a portion of hood, plates of substantial size can be provided while still retaining the principal structural strength of the hood.

Considering the size of the plates from a dimensional standpoint, for very small vehicles, the plates could be as small as three (3) inches on a side. For larger passenger vehicles, the plates could be as much as one and three-quarters (1¾) feet on a side and possibly larger, depending on the size of the vehicle. For a middle sized automobile, a desirable plate size is at least about three-quarters (¾) and preferably at least about one (1) square foot per plate. The plates can be square or rectangular, having one side larger than the other.

It is desired that the front edge of the plate be relatively straight, so that the plates, when raised, provide an upwardly extending ramp or inclined plane, which deflects air in a laminar fashion over the plate. This enhances the venturi effect for withdrawing hot air from the engine compartment and also enhances bug and stone deflection from the windshield. The rear edge of the plate does not have to be straight, but desirably is straight in order to enhance the foregoing characteristics.

The rear edge of the hood plate should terminate well forward of the base of the windshield, desirably at least six (6) inches and preferably a foot, or more. When a vehicle is travelling at some speed, the air flow hitting the windshield can create a high pressure zone at the windshield and can actually cause a downdraft into a rear facing vent at the base of the windshield. The venturi effect is improved if the rear edge of the plate is forward of the base of the windshield.

Preferably the hood plates can be raised at the rear edge by a minimum of at least one (1) inch and preferably two (2) inches, and even more preferably three (3) inches. If the plate is raised more than four (4) inches, the plate may disrupt air flow over the hood too severely, at least when the vehicle is moving at any rate of speed. The maximum height of the hood plate would be reduced for a smaller hood plate. A three (3) inch or four (4) inch maximum might be permissible for a large hood plate having a front-to-back length of fifteen (15) to eighteen (18) inches, but such a large elevation might not be possible or practical with a smaller plate. In order to obtain a reasonable amount of air deflection, the hood plate should be raisable at least an inch and preferably two (2) inches from the surface of the hood. In order to maintain proper flow over the angularly raised hood plate, the hood plate should not be inclined at an angle of more than eighteen degrees (18°) with respect to the hood surface. When the hood plate is raisable for as much as three (3) inches, the maximum angle of the hood plate should be no more than about twelve degrees (12°) to possibly as much as fifteen degrees (15°).

As stated above, the hood plate desirably is formed of a light transmitting glass or plastic resin material. This material can be darkly smoked or it can have a somewhat reflective surface (including a mirrored exterior finish) depending upon the aesthetics desired. The light transmission feature of the present invention makes it possible to permit solar radiation to penetrate the hood of the vehicle. Thus, on cold days, there can be a certain amount of passive solar collection under the hood of the vehicle which will facilitate starting the vehicle on cold days. The light transmitting hood panel can be transparent so as to provide visibility into the engine compartment, if desirable.

As shown in FIG. 8, another feature that can be achieved by a light transmitting hood panel is that an electrical solar collector 112 can be mounted beneath the light transmissive hood panel. The electrical solar collector can be connected to the battery to charge the battery or to otherwise provide electrical energy for the vehicle system.

The foregoing is representative of the preferred practice of the present invention. Various modifications may be made in the embodiments described without departing from the spirit and scope of the present invention, which is defined in the appended claims.

I claim:

1. In a vehicle having a raisable hood that covers an engine compartment, the improvement comprising a raisable hood plate mechanism mounted in at least one opening in the hood, the hood plate mechanism comprising:

at least one plate that fits over each opening;

mounting means for mounting each plate in an opening for pivotal movement about a transverse axis positioned toward a front portion of the plate in the direction of vehicle movement, such that a rear edge of the plate can be pivoted between a lowered position wherein the plate lies flat with respect to the hood and substantially closes the opening, and a raised position wherein the rear edge of the plate is raised above the hood, creating a rear-facing engine compartment ventilation opening at the rear edge of the plate;

latch means for selectively holding the plate in its raised and lowered positions and solar panel means for generating electricity.

2. A hood plate mechanism according to claim 1, wherein the plate has a mirrored exterior finish.

3. A hood plate mechanism according to claim 1, wherein the hood plate mechanism comprises two generally rectangular plates, each plate being mounted in its own hood opening in the hood; the openings being formed side-by-side on opposite lateral sides of the hood, the plates being pivotally connected to the hood openings along a front edge thereof, in the direction of vehicle movement, and the plates being selectively raisable between raised and lowered positions along a rear edge thereof so as to open and close a vent opening between the rear edge of the plates and the adjacent edge of its hood opening.

4. A hood plate mechanism according to claim 1, wherein one hood plate is positioned directly in front of the driver's position in the vehicle and is sufficiently large and can be raised to a sufficiently elevated position with respect tot he surface of the hood that the hood plate, when raised, deflects particles entrained in air passing over the hood away from the windshield and deflects solar glare away from the eyes of a vehicle operator under conditions where there would otherwise be a disturbing glare off the vehicle hood.

5. A hood plate mechanism to claim 1, wherein the hood has a generally horizontal surface where the hood plate mechanism is mounted and the total area of the one or more plates is at least ten percent (10%) of the area of the horizontal surface of the hood.

6. A hood plate mechanism according to claim 1, wherein the hood plate mechanism comprises one or more generally rectangular plates each having a surface area of about one square foot or more, each plate being mounted in its own opening in the hood, each plate being generally flush with the surface of the hood when in its lowered position, each plate having a rear edge that extends upwardly at least one inch from the plane of the hood when raised, each plate having a front edge that remains in the plane of the hood and is pivotally attached thereto when the rear edge of the plate is raised, the raising of the rear edge of the plate urging deflection of air currents, bugs and solar glare away from the vehicle windshield, while at the same time providing a rear facing vent opening from the engine compartment, the raised plate providing an inclined surface facing the air moving over the hood when the vehicle is moving, such movement f air over the vehicle hood and the rear edge of the inclined plate enhancing the withdrawal of heated air from the engine compartment when the vehicle is moving forward.

7. A hood plate mechanism according to claim 1, wherein the mechanism comprises at least one hood plate opening and a hood plate covering the opening, the rear edge of the hood plate being positioned at least six (6) inches forward oft he rear edge of the hood, a vehicle windshield being located adjacent the rear edge of the hood.

8. A hood plate mechanism according to claim 1 wherein the mounting means comprises a frame that extends around the periphery of the opening in the hood and is attached thereto, the hood plate fitting into the frame and closing the opening when the plate is seated int he frame, the plate being connected to the frame by pivot connectors at a front edge of the plate and being connected to the frame at a rear edge of the plate by the latch means, the latch means extending between the plate and frame.

9. A hood plate mechanism according to claim 8, wherein the latch means is a pivot linkage interconnecting the rear edge of the plate with an adjacent portion of the frame, the pivot linkage being capable of releasably locking the plate in its closed position, and being pivotable to permit the rear edge of the plate to be raised to its raised position above the hood, the pivot linkage being capable of holding the plate in its raised position.

10. A hood plate mechanism according to claim 8, wherein the mechanism comprises a pair of generally square shaped hood plates positioned in separate hood openings which are spaced laterally apart on opposite sides of the hood, the hood plates being positioned inwardly of peripheral edges of the hood, the plates being at least about three-quarters ($\frac{3}{4}$) of a square foot per plate, the rear edges of the plate being raisable at least about two (2) inches above the surface of the hood in their raised positions.

11. A hood plate mechanism according to claim 10, wherein the hood plates are mounted in a generally flat, horizontal surface of the hood and the hood plate mechanism comprises about ten percent (10%) to about thirty percent (30%) of the total area of said surface.

12. A hood plate mechanism according to claim 1 and further comprising a remote actuation means for raising and lowering the hood plate from the interior of the vehicle.

13. A hood plate mechanism according to claim 12, wherein the remote actuation means comprises:
a movable linkage interconnecting the plate and the hood that can be manipulated to move the plate between its lowered and raised positions; and
manually actuatable cable means extending between the movable linkage and a manually movable member inside the vehicle, manual operation of the movable member causing the cable means to manipulate the movable linkage to raise and lower the plate.

14. A hood plate mechanism according to claim 12, wherein the remote actuation means comprises solenoid means drivingly connected to the plate for raising and lowering the plate, the solenoid means being actuated by a switch located in the vehicle.

15. A hood plate mechanism according to claim 12, wherein the remote actuation means comprises a fluid driven drive cylinder means drivingly connected to the plate to raise and lower the plate, wherein fluid drive means actuated from the interior of the vehicle provides fluid to the drive cylinder to raise and lower the plate.

16. A hood plate mechanism according to claim 12, wherein the remote actuation means comprises an electrically operated or fluid operated motor that provides a rotative drive force and a gear means driven by the rotative drive force of the motor for raising and lowering the plate.

17. A hood plate mechanism according to claim 12, wherein the remote actuation means is electrically operated and further comprising automatic closing means for actuating the remote actuation means to automatically close the plate at least after a period of time if the vehicle is parked and left with the plate open.

18. A hood plate mechanism according to claim 17, wherein the automatic closing means is actuated by a thermostatic switch means that causes the plate to be closed when the engine temperature drops to a level indicating that the engine has been turned off.

19. A hood plate mechanism according to claim 17, wherein the automatic closing means is actuated by a timer switch means that causes the plate to be closed in response to a change in the vehicle electrical system that reflects that the vehicle has been turned off.

20. A hood plate mechanism according to claim 1, wherein the plate comprises light transmissive material that transmits solar radiation to the interior of the engine compartment.

21. A hood plate mechanism according to claim 20, wherein the hood plate is sufficiently transparent to permit a person to see into the engine compartment through the plate.

22. A hood plate mechanism according to claim 20, wherein the plate is formed of a darkly smoked material such that the plate transmits filtered light but appears to be a dark panel to visual inspection.

* * * * *

UNITED STATES PATENT AND TRADEMARK OFFICE
CERTIFICATE OF CORRECTION

PATENT NO. : 5,275,249

DATED : January 4, 1994

INVENTOR(S) : RICHARD L. NELSON

It is certified that error appears in the above-identified patent and that said Letters Patent is hereby corrected as shown below:

Col. 3, line 29, after "opening 44", insert --in the glass--

Col. 4, line 44, delete "manual actuated", insert --manually actuatable--

Col. 7, line 29, delete "tot he", insert --to the--

Col. 7, line 58, delete "f air", insert --of air--

Col. 7, line 65, delete "oft he", insert --of the --

Signed and Sealed this

Twenty-eighth Day of June, 1994

Attest:

BRUCE LEHMAN

*Attesting Officer*   *Commissioner of Patents and Trademarks*